US008788239B2

(12) United States Patent
Crandall et al.

(10) Patent No.: US 8,788,239 B2
(45) Date of Patent: Jul. 22, 2014

(54) METHODS, APPARATUS AND ARTICLES OF MANUFACTURE TO TEST BATCH CONFIGURATIONS

(75) Inventors: Brian Crandall, Austin, TX (US); Dirk Thiele, Austin, TX (US); Noel Bell, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 574 days.

(21) Appl. No.: 13/025,441

(22) Filed: Feb. 11, 2011

(65) Prior Publication Data

US 2012/0209557 A1    Aug. 16, 2012

(51) Int. Cl.
*G06F 19/00* (2011.01)
*G05B 21/00* (2006.01)
*G06F 7/00* (2006.01)

(52) U.S. Cl.
USPC ............................ 702/123; 700/266; 707/643

(58) Field of Classification Search
USPC .......... 702/123, 108, 113–114; 700/9, 11–12, 700/17–18, 90, 108–109, 266; 707/643; 715/255, 764, 853; 717/110–111, 717/120–121, 123–124, 127, 132, 134, 717/162–163
See application file for complete search history.

(56) References Cited

U.S. PATENT DOCUMENTS 6,647,315 B1 * 11/2003 Sherriff et al. ................ 700/204

FOREIGN PATENT DOCUMENTS

GB          2430763          4/2007

OTHER PUBLICATIONS

Govindhasamy et al., Second-Order Training of Adaptive Critics for Online Process Control, Apr. 2005, IEEE Transactions on Systems, Man, and Cybernetics—Part B: Cybernetics, vol. 35, No. 2, pp. 381-385.*
Intellectual Property Office of Great Britain, "Search Report," issued in connection with application serial No. GB1121810.4, issued Mar. 28, 2012, 3 pages.
Crandall, Brian, "Software Process Improvement: Reducing Cost, Time and Risk of Testing Control System Software Projects," University of Texas Class Paper, Aug. 2007 (7 pages).

* cited by examiner

*Primary Examiner* — Toan Le
(74) *Attorney, Agent, or Firm* — Hanley, Flight & Zimmerman, LLC

(57) ABSTRACT

Example methods, apparatus and articles to test batch configurations are disclosed. A disclosed example method includes identifying, using a processor, an execution path through a batch configuration of a process control system, generating a test plan for the execution path, stimulating the process control system to execute the test plan, and recording a result of the test plan.

20 Claims, 29 Drawing Sheets

| # | Command | Input/Output | Type | Agent |
|---|---|---|---|---|
| 1 | Start SFC | Input | External Program | Batch Executive |
| 2 | SFC Active | Output | Information | SFC |
| 3 | S1 Active | Output | Information | SFC |
| 4 | T1 = False | Output | Information | SFC |
| 5 | S1 Pending Confirms = 0 | Output | Information | SFC |
| 6 | T1 = True | Output | Information | SFC |
| 7 | End Flag = True | Input | External Program | OPC Link |
| 8 | S2 Active | Output | Information | SFC |
| 9 | T2B = False | Output | Information | SFC |
| 10 | S2/A1: Display prompt. | Output | External Program | SFC |
| 11 | Prompt answer = "yes" | Input | Human Interaction | Batch Executive |
| 12 | T2B = True | Output | Information | SFC |
| 13 | S3 Active | Output | Information | SFC |
| 14 | T3B = False | Output | Information | SFC |
| 15 | S3/A1: Open valve XV-101. | Output | Field Signal | SFC |
| 16 | S3/A2: Open valve XV-102. | Output | Field Signal | SFC |
| 17 | S3/A1: Valve XV-101 is open. | Input | Field Signal | Controller |
| 18 | S3/A2: Valve XV-102 is open. | Input | Field Signal | Controller |
| 19 | S3 Pending Confirms = 0 and End Flag = True. | Output | Information | SFC |
| 20 | T3B = True | Output | Information | SFC |

| # | Command | Input/Output | Type | Agent |
|---|---|---|---|---|
| 0a | Disable T1. | Input | External Program | BAT |
| 0b | Set S1 data to opposite states. (None) | Input | External Program | BAT |
| 0c | Record Results for S1 | Input | External Program | BAT |
| 0d | Record Results for T1 | Input | External Program | BAT |
| 1 | Start SFC | Input | External Program | BAT |
| 2 | SFC Active | Output | Information | SFC |
| 3 | S1 Active | Output | Information | SFC |
| 4 | T1 = False | Output | Information | SFC |
| 5 | S1 Pending Confirms = 0 | Output | Information | SFC |
| 5b | Wait for T1 = True | Input | External Program | BAT |
| 6 | T1 = True | Output | Information | SFC |
| 6b | Record Results for S1 | Input | External Program | BAT |
| 6c | Record Results for T1 | Input | External Program | BAT |
| 6d | Disable T2A and T2B. | Input | External Program | BAT |
| 6e | Set S2 data to opposite states. (None) | Input | External Program | BAT |
| 6e | Record Results for S2 | Input | External Program | BAT |
| 6f | Record Results for T2B | Input | External Program | BAT |
| 6g | Enable T1. | Input | External Program | BAT |
| 7 | End Flag = True | Input | External Program | OPC Link |
| 8 | S2 Active | Output | Information | SFC |
| 9 | T2B = False | Output | Information | SFC |
| 10 | S2/A1: Display prompt. | Output | External Program | SFC |
| 11 | Prompt answer = "yes" | Input | External Program | BAT |
| 11b | Wait for T2B = True | Input | External Program | BAT |
| 12 | T2B = True | Output | Information | SFC |
| 12b | Record Results for S2 | Input | External Program | BAT |
| 12c | Record Results for T2B | Input | External Program | BAT |
| 12d | Disable T3A and T3B. | Input | External Program | BAT |
| 12e | Set S3 data to opposite states. 1 - Close valve XV-101. 2 - Close valve XV-102. | Input | External Program | BAT |
| 12f | Record Results for S3 | Input | External Program | BAT |
| 12g | Record Results for T3B | Input | External Program | BAT |
| 12h | Enable T2B. | Input | External Program | BAT |
| 13 | S3 Active | Output | Information | SFC |
| 14 | T3B = False | Output | Information | SFC |
| 15 | S3/A1: Open valve XV-101. | Output | Field Signal | SFC |
| 16 | S3/A2: Open valve XV-102. | Output | Field Signal | SFC |

FIG. 6

| Keywords (from Description) | Module Type | Set Path | Confirm Path | Set State | Confirm State |
|---|---|---|---|---|---|
| Detected When Building Test Plan | | Commands Built From Detection | | | |
| "Open valve" | PCSD_VALVE | @MODULE@/RSP.CV | @MODULE@/PV.CV | CLOSE | OPEN |
| "Close valve" | PCSD_VALVE | @MODULE@/RSP.CV | @MODULE@/PV.CV | OPEN | CLOSED |
| "Set equipment module to START" | PCSD_EM | @MODULE@/A_COMMAND.CV | @MODULE@/PV.CV | STOP | START |
| "Set equipment module to PUMP" | PCSD_PUMP_EM | @MODULE@/A_COMMAND.CV | @MODULE@/PV.CV | STOP | PUMP |

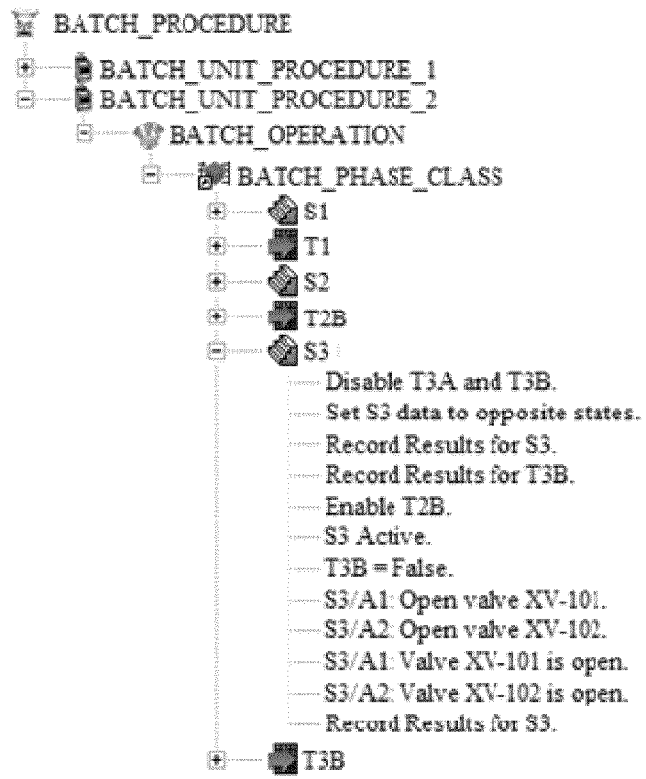

1. Clear *Active Path*.
2. Add INITIAL_STEP to *Pending Nodes*.
3. Select first node (alphabetical order) in *Pending Nodes* and set this node as the *Active Node*. (At first it will be the INITIAL_STEP.)
4. Add the *Active Node* to the *Active Path*.
5. Remove the Active *Node* from *Pending Nodes*.
6. Determine all connections emanating from the *Active Node*. These types of connections are the 'To Connections' of the *Active Node*.
7. Add all nodes connecting from the *Active Node* (all nodes that exist in 'To Connections' from the *Active* Node) to *Pending Nodes*. Do not add the node if it already exists in *Pending Nodes*.
8. Save *Active Path* to each of the nodes' *To Path* in *Pending Nodes* field.
9. *Sort* all nodes in *Pending Nodes* alphabetically.
10. Select first node in *Pending Nodes* that is connected from the *Active Node*. I.e. this node exists in the 'To Connections' of the *Active Node*.
    a. Set this pending node as the *Active Node*.
11. Add the *Active Node* to the *Active Path*.
12. Remove the *Active Node* from *Pending Nodes*.
13. Determine all connections emanating from the *Active Node*. These types of connections are the 'To Connections' of the *Active Node*.
14. If there are no 'To Connections,' then the *Active Node* is a termination or hanging transition.
15. If the *Active Node* exists in any path in *Confirmed Paths* or in the *Active Path* then the *Active Node* has been traversed previously.
16. If Active *Node* is not a termination, hanging transition, or has not been traversed previously, go to step 7.
17. If Active *Node* is a termination or hanging transition then go to step 19.
18. If *Active Node* has been traversed previously find existing path from a termination or hanging transition to the *Active Node*.
    a. Search all paths in *Confirmed Paths* for a path containing the *Active Node*.
    b. If a path in *Confirmed Paths* contains the *Active Node* do the following:
        i. Find first path in *Confirmed Paths* that contains the *Active Node*.
        ii. Concatenate the path from the *Active Node* to the termination or hanging transition on the end of the *Active Path*. Do not duplicate the *Active Node*.
        iii. Go to step 19.
    c. If no path in *Confirmed Paths* contains the *Active Node* go to step 19.
19. Add the *Active Path* to *Confirmed Paths*.
    a. If the *Active Path* does not have a termination or hanging transition, then set the *Partial Path* flag for this path when it is added to *Confirmed Paths*.
20. If the number of nodes in *Pending Nodes* = 0, go to step 25.
21. Clear the *Active Path*.
22. Select first node in *Pending Nodes* and set it as the *Active Node*.
23. Select all nodes from the *To Path* field of the *Active Node* and add them, in order of traversal, to the *Active Path*.
24. Go to step 4.
25. For all paths in *Confirmed Paths* that have the *Partial Path* flag set do the following:
    a. Set the path to the *Active Path*.
    b. Set the last node in the *Active Path* as the *Active Node*.
    c. Search all paths in *Confirmed Paths* for a path containing the *Active Node*.
    d. For the first path in *Confirmed Paths* that contains the *Active Node* do the following:
        i. Concatenate the path from the *Active Node* to the termination or hanging transition on the end of the *Active Path*. Do not duplicate the *Active Node*.
        ii. Replace the path in *Confirmed Paths* with the *Active Path*.
26. Clear the *Active Path*.
27. Clear the *Active Node*.

FIG. 12

1. Clear *Reduced Path, Diverging Transition, Parallel Path Roots, Grouped Logic Block,* and *Active Diverging Transition.*
2. Copy *Confirmed Path* from Path Discovery into *Reduced Path.*
3. From the .FHX file, identify all the transitions that have multiple outputs (i.e. instances of parallel divergence). Save these transition names to the *Diverging Transition* object.
4. From the .FHX file, identify all the transitions that have multiple inputs (i.e. instances of parallel convergence). Save these transition names to the *Converging Transition* object.
5. For each transition in *Diverging Transition*, parse the .FHX file for all steps connected from the transition (i.e. the beginning of the parallel branches). Save these step names to the *Parallel Path Roots* object.
6. Set the *Active Diverging Transition.*
   a. Select the next transition (alphabetically) in *Diverging Transition* that is not in *Processed Diverging Transition* and is not in *Contains Nested Diverging Transition* and set it to the *Pending Active Diverging Transition.*
   b. If no more transitions from *Diverging Transition* can be selected then no parallel divergence exists. Proceed to step 19.
   c. If the *Pending Active Diverging Transition* does not have any other *Diverging Transition* reachable from it down the SFC graph, then set this transition to *Active Diverging Transition*. In other words, there are no diverging transitions that occur after the *Active Diverging Transition* in the SFC. This will require a special function that can extract this information from *Reduced Path*. This step uses *Reduced Path* because it accounts for those paths that have been rolled up into grouped logic blocks. Note: this step is necessary because the most nested parallel branches must be reduced first in order to prevent information loss. The following sub-steps will be performed.
      i. Select the next transition (alphabetically) in *Diverging Transition* that is not equal to the *Pending Active Diverging Transition.*
      ii. If the transition selected from *Diverging Transition* does not occur after the *Pending Active Diverging Transition* in the SFC graph then go to step 6.c.i.
      iii. If the transition selected from *Diverging Transition* does occur after the *Pending Active Diverging Transition* in the SFC graph then do the following.
         A. If the transition selected from *Diverging Transition* is in *Processed Diverging Transition*, then go to step 6.c.i.
         B. If the transition selected from *Diverging Transition* is not in *Processed Diverging Transition*, then and the *Pending Active Diverging Transition* to *Contains Nested Diverging Transition* and go to step 6.a.
      iv. If no other transitions can be selected from *Diverging Transition*, then set *Pending Diverging Transition* to *Active Diverging Transition.*
      v. Clear *Contains Nested Diverging Transition.*

FIG. 13A

7. Set the *Active Parallel Path Root*.
   a. Select the next step (alphabetically) in *Parallel Path Root* that is not in *Processed Parallel Path Root* and has a value in the "Diverging Transition" field equal to the *Active Diverging Transition*.
   b. If no steps match these criteria, then all *Parallel Path Root* steps have been processed for this *Active Diverging Transition*. Proceed to step 13.
   c. If a step matches these criteria, then set this step to the *Active Parallel Path Root*.
8. Find all paths in the branch from the *Active Parallel Path Root* to the first converging transition, termination, transition with no connections from it (hanging transition), or Grouped Logic Block with no connections from it.
   a. Select the next path from *Reduced Path* and clear *Parallel Path Traversal*.
   b. If there are no more paths in *Reduced Path*, then go to step 9.
   c. If *Active Parallel Path Root* is not in the *Reduced Path*, then go to step 8.a.
   d. If *Active Parallel Path Root* is in the *Reduced Path*, then do the following.
      i. In the *Reduced Path* start at the *Active Parallel Path Root* and add this node to *Parallel Path Traversal*.
      ii. Go to the next node in *Reduced Path* and set this node to the *Evaluated Node*.
      iii. If the *Evaluated Node* is not a *Converging Transition* or the *Evaluated Node* is in *Processed Converging Transition*, then add this node to *Parallel Path Traversal* and go to step 8.d.ii. Note that if the *Evaluated Node* is a termination, hanging transition, or a Grouped Logic Block with nothing connected from it, then it is added to *Parallel Path Traversal* because it is part of the parallel branch execution (i.e. there is no converging transition).
      iv. If the *Evaluated Node* is a *Converging Transition* and the *Evaluated Node* is not in *Processed Converging Transition* or if the *Evaluated Node* is a termination, hanging transition, or if the *Evaluated Node* is a Grouped Logic Block with nothing connected from it, then do the following.
         A. Set the *Active Converging Object* equal to the *Evaluated Node*.
         B. If the *Active Parallel Path Root* does not exist in any entry in *Grouped Logic Block*, then do the following.
            1. Create a new entry in *Grouped Logic Block* that has a unique name. Preface the name with the "~" character since this is an invalid character to name steps in DeltaV. This will prevent confusion between actual block names and the internal Group Logic Block names used by this program.
            2. In the *Grouped Logic Block* add the *Active Diverging Transition*, *Active Converging Object*, the type of convergence (Converging Transition, Termination, Hanging Transition, or GLB with Termination), *Active Parallel Path Root*, and *Parallel Path Traversal*.
            3. Proceed to step 8.a.
         C. If the *Active Parallel Path Root* exists in any entry in *Grouped Logic Block*, then do the following.
            1. If the *Parallel Path Traversal* does not exist in any of the Paths within the *Grouped Logic Block* (where *Active Parallel Path Root* is equal to the Root value), then do the following.
               I. In the *Grouped Logic Block* add the *Parallel Path Traversal* to Paths. Note that this is an additional path in the *Grouped Logic Block* indicating serial divergence.
            2. If the *Parallel Path Traversal* exists in any of the Paths within the *Grouped Logic Block* (where *Active Parallel Path Root* is equal to the Root value), then proceed to step 8.a. This prevents adding superfluous *Parallel Path Traversal* paths that occur due to the fact that the Path Discovery algorithm traces over the path multiple times to ensure coverage at some location in the SFC.

FIG. 13B

9. Replace all Paths within the *Grouped Logic Block* with the Name of the *Grouped Logic Block* in *Reduced Path*. Also, ensure that there are no duplicate paths.
    a. For each Path in *Reduced Path* do the following.
        i. If any path in the Paths field of *Grouped Logic Block* matches a sub-path pattern of nodes within *Reduced Path*, then replace the sub-path pattern with the name of the *Grouped Logic Block*. Note that the Paths field in *Grouped Logic Block* may have multiple paths that need to be replaced. This requires a function to search intra-path patterns of paths.
        ii. Remove duplicate path entries.
            A. If the newly replaced *Reduced Path* already exists in *Reduced Path* then delete the entry from *Reduced Path*. This will occur in cases of serial divergence/convergence.
10. Add the *Active Parallel Path Root* to *Processed Parallel Path Root*.
11. Clear *Active Parallel Path Root*, and *Evaluated Node*.
12. Go to step 7.
13. Combine parallel blocks in *Grouped Logic Block* into a single block in *Grouped Logic Block*.
    a. Create a new entry in *Grouped Logic Block* that has a unique name. Preface the name with the "~" character since this is an invalid character to name steps in DeltaV. This will prevent confusion between actual block names and the internal *Group Logic Block* names used by this program.
    b. Add the Name of the *Active Diverging Transition* to the Diverging Transition field of the newly created *Group Logic Block* entry.
    c. Set the Converging Object field of the newly created *Group Logic Block* to "N/A".
    d. Set the Converging Type field of the newly created *Group Logic Block* to "N/A" and set the Multi-Diverge field of the newly created *Group Logic Block* to false (default).
    e. Set the Root field of the newly created *Group Logic Block* entry to "N/A".
    f. Select the next entry in *Grouped Logic Block* (excluding the newly created entry).
        i. If the *Grouped Logic Block* has its Multi-Diverge field set to true, then go to step 13.f.
    g. If no more entries exist in *Grouped Logic Block*, then proceed to step 14.
    h. If the Diverging Transition field is equal to the *Active Diverging Transition* then do the following.
        i. If Converging Type field of the newly created *Group Logic Block* is "N/A" or "GLB with Termination" then do the following.
            A. If the selected *Grouped Logic Block* Converging Type is "Termination", "Hanging Transition," or "GLB with Termination" then do the following.
                1. If Converging Type field of the newly created *Group Logic Block* is "N/A" then do the following.
                    I. Set the Converging Type field of the newly created *Group Logic Block* to "GLB with Termination".
                2. Add the Name field of the selected *Grouped Logic Block* to the Paths field of the newly created entry in *Grouped Logic Block*. There is only one path in the Paths collection for a *Group Logic Block* that is used to amalgamate sub-blocks. The logic blocks in the Paths field are separated by the "||" string to denote parallel execution

FIG. 13C ii. If Converging Type field of the newly created *Group Logic Block* is "N/A" or "Converging Transition" then do the following.
   A. If the selected *Grouped Logic Block* Converging Type is "Converging Transition" then do the following.
      1. If Converging Type field of the newly created *Group Logic Block* is "N/A" then do the following.
         I. Set the Converging Type field of the newly created *Group Logic Block* to "Converging Transition".
         II. Set the Converging Object field of the newly created *Group Logic Block* to the Converging Object field of the selected *Group Logic Block*.
         III. Set the *Active Converging Object* to the value of the Converging Object of the newly created *Group Logic Block*. This will ensure that the proper *Active Converging Object* is set to this GLB's converging transition. This occurs when another parallel GLB is created with the same *Active Diverging Transition* but a different converging transition before this GLB is created.
      2. If the Converging Object field of the newly created *Group Logic Block* is equal to the Converging Object field of the selected *Group Logic Block* then do the following.
         I. Add the Name field of the selected *Grouped Logic Block* to the Paths field of the newly created entry in *Grouped Logic Block*. There is only one path in the Paths collection for a *Group Logic Block* that is used to amalgamate sub-blocks. The logic blocks in the Paths field are separated by the "||" string to denote parallel execution.
   iii. Go to step 13.f.
14. Replace all *Grouped Logic Block* names in *Reduced Path* with the Name of the newly created *Grouped Logic Block* if they are contained in the Paths field. Also, ensure that there are no duplicate paths.
   a. For each Path in *Reduced Path* do the following.
      i. If any *Grouped Logic Block* name in the Paths field (separated by the "||" string) of the newly created *Grouped Logic Block* matches *Grouped Logic Block* name within *Reduced Path*, then replace the name in the path with the name of the newly created *Grouped Logic Block*. Note that the Paths field in *Grouped Logic Block* only has one path since it is an amalgamation of parallel paths.
      ii. Remove duplicate path entries.
         A. If the newly replaced *Reduced Path* already exists in *Reduced Path* then delete the entry from *Reduced Path*.
15. Check to see if all connections after the *Active Diverging Transition* are the same. If not, add the newly created GLB to the *Parallel Path Root* list and do not add the *Active Diverging Transition* to the *Processed Diverging Transition*. If so, add the *Active Diverging Transition* to the *Processed Diverging Transition*. The following logic accomplishes these tasks.
   a. Select the next Path in *Reduced Path* and do the following.
      i. If the Path contains the *Active Diverging Transition* then do the following.
         A. If the *Active Diverging Transition* is connected to the newly created GLB, then go to step 15.a.
         B. If the *Active Diverging Transition* is not connected to the newly created GLB (i.e. some other step or GLB), then do the following.
            1. Add the newly created GLB to *Parallel Path Root*.
            2. Set the newly created GLB's Multi-Diverge Flag.
            3. Set the Multi-Diverge flag of GLBs in the path of the newly created GLB.
            4. Go to step 16.
      ii. If the Path does not contain the *Active Diverging Transition* then go to step 15.a.
   b. If no additional Paths exist in *Reduced Path* then do the following.
      i. Add the *Active Diverging Transition* to *Processed Diverging Transition*.

FIG. 13D

16. Add the *Active Converging Object* to *Processed Converging Transition* if the newly created *Grouped Logic Block* from step 15 was used. If the only "first-order" *Diverging Transition* detected is the A*ctive Diverging Transition*, then add the *Active Converging Object* to the *Processed Converging Transition*. The logic is also able to handle the case of Partial Reconvergence on a Serial Divergence.
    a. Find all first-order diverging transitions that are connected up the SFC graph to the *Active Converging Object*. The term "first-order" indicates that the diverging transition is the first diverging transition detected. I.e. the search does not continue up the SFC graph out of the nested divergence.
    ii. Select the next entry in *Reduced Path*.
    iii. If the Path field contains the *Active Converging Object*, then do the following.
        A. Find the first *Diverging Transition* that exists "up" the *Reduced Path* ("up" means that the path is traced in reverse).
        B. If the *Diverging Transition* does not exist in *Processed Diverging Transition* then add the *Diverging Transition* to <u>*Upstream Diverging Transitions.*</u>
    iv. If the Path field does not contain the *Active Converging Object*, then proceed to step 16.a.i.
    v. If the number of items in *Upstream Diverging Transitions* is 0 (no unprocessed first-order *Diverging Transitions* exist up the SFC graph) or if the number of items in *Upstream Diverging Transitions* is 1 and that *Diverging Transition* is equal to the *Active Diverging Transition* (the only unprocessed first-order *Diverging Transition* is the *Active Diverging Transition* which is to be used in another *Grouped Logic Block*) then to the following.
        A. Add *Active Converging Object* to *Processed Converging Transition*.
    vi. Check if there are *Grouped Logic Blocks* with both the Multi-Diverge Flag = True and = False connected from the *Active Diverging Transition*.
        A. If the *Active Diverging Transition* is connected to any GLB with the Multi-Diverge Flag = True, then do the following.
            1. If the *Active Diverging Transition* is connected to any GLB with the Multi-Diverge Flag = False, then do the following.
                I. Find the next *Group Logic Block* connected from the *Active Diverging Transition* that does not have the Multi-Diverging Flag set.
                II. Set the *Active Converging Object* to the Converge Object of the selected *Group Logic Block*.
                III. Since there are some GLBs connected to a multi-diverging step that have not been processed, go to step 13.
17. Clear *Active Diverging Transition* and *Upstream Diverging Transitions*.
18. Clear Active Converging Object and Evaluated Node and go to step 6.
19. Output *Reduced Path* as final result.
20. End algorithm.

FIG. 13E

1. Build entries in *Text Output String*.
   a. Copy all entries from *Reduced Path* into *Text Output String*. Make sure that the *Reduced Path* objects are converted to a string format.
   b. Insert the string "->" between each object name to indicate path flow.
   c. Select the next entry in *Text Output String*.
   d. If no more entries in *Text Output String* exist, then go to step 2.
   e. For each object name, *Node* or *Grouped Logic Block,* do the following. Note, skip the following strings, since they are not object names: "->", "(", ")", "||".
      i. If the object name contains "~", i.e. it is a *Grouped Logic Block*, then do the following.
         A. If the *Grouped Logic Block* has only one path, then do the following.
            1. Remove this object name and insert the strings "(" and ")".
            2. Insert the string names of the path objects from the path field of the *Grouped Logic Block*. Make sure the names are inserted between the newly created "(" and ")" strings.
               I. If the names contain "~", i.e. they are *Grouped Logic Blocks*, then separate the names by the "||" string.
               II. If the names do not contain "~", i.e. they are *Nodes*, then separate the names by the "->" string.
         B. If the *Grouped Logic Block* has more than one path, then do the following.
            1. Create x - 1 number of copies of the *Text Output String* and insert them after the current *Text Output String* in the array – where x is equal to the number of paths in the *Grouped Logic Block*.
            2. Save the index of the current *Text Output String*.
            3. For each path in *Grouped Logic Block*, do the following.
               I. Remove this object name and insert the strings "(" and ")".
               II. Insert the string names of the path objects from the path field of the *Grouped Logic Block*. Make sure the names are inserted between the newly created "(" and ")" strings.
                  01. If the names contain "~", i.e. they are *Grouped Logic Blocks*, then separate the names by the "||" string.
                  02. If the names do not contain "~", i.e. they are *Nodes*, then separate the names by the "->" string.
               III. Select the next string in *Text Output String*. If the number of paths in the *Grouped Logic Block* is exceeded, then set the *Text Output String* to equal to the one saved by the index at step 1.e.2.
      ii. If the object name is not a *Grouped Logic Block*, then insert the *Node* name into the string.
   f. Proceed to step 1.c.
2. End algorithm.

FIG. 14

1. Read the next path from *Text Output String* from Path Discovery.
2. If no more paths exist, then proceed to step 14.
3. Create the XML file with the name of the test plan (include SFC name and path number).
4. Create a root XML node with the name of the test plan.
5. Create an XML attribute with the name of the path.
6. Create an XML attribute with the description.
7. Retrieve the corresponding *Reduced Path* for the *Text Output String*.
8. Create an XML node under the root for the *Thread*. Note that the *Thread* name will include a number to indicate its order of creation. Set the *Thread* source to the *Reduced Path*. Set the *Thread* type to "serial".
9. Iterate over *Reduced Path*, creating a *Thread* for each object.
10. If *Thread* source is a *Grouped Logic Block,* then check *Grouped Logic Block* to determine path that will be used for the test plan.
    a. If the *Grouped Logic Block* has more than one path, then do the following:
        i. For each path in *Grouped Logic Block* compare the first transition to the *Text Output String* path. The *Grouped Logic Block* paths must each have a unique transition because of the nature of the *Grouped Logic Block* properties. Note, that if the *Grouped Logic Block* path has only one node, you must instead compare that one node to the *Text Output String* Path.
            1. If the transition/single node is found within the *Text Output String* then set this path as *The current test path*.
    b. If the *Grouped Logic* Block is a parallel type then do the following:
        i. Add an XML node under the *Thread* for the transition *Object* connected to the *Grouped Logic Block*.

FIG. 15A ii. Add XML attributes for the following aspects of the *Object*: Name and Type. The Name comes from the name of the *Object* and the Type is specified by the type of *Node* or if it is a *Grouped Logic Block*.
iii. Add the following XML child nodes to the *Object*: Pre-Tasks, During-Tasks, and Post-Tasks.
iv. Insert the following XML nodes of type "Task" with the attribute fields according to the following table. (Note that the task is inserted in the During-Task).

| Task Nodes ||||
| --- | --- | --- | --- |
| Number Attribute | Test Case Name Attribute | Expected Result Attribute | Actual Result Attribute |
| Set to the next highest number for all Task nodes in During-Tasks | Enable transition [Transition Name connected to the *Grouped Logic Block*]. | Transition [Transition Name connected to the *Grouped Logic Block*] is enabled. | *Blank* |

Table 6: Transition Tasks (Post-Tasks)

v. The Pre-Task and Post-Task XML node categories are blank.

11. For each of the objects (*Nodes* or *Grouped Logic Block*) in *The current test path* do the following.
   a. Add an XML node under the *Thread* for the *Object*.
   b. Add XML attributes for the following aspects of the *Object*: Name and Type. The Name comes from the name of the *Object* and the Type is specified by the type of *Node* or if it is a *Grouped Logic Block*.
   c. Add the following XML child nodes to the *Object*: Pre-Tasks, During-Tasks, and Post-Tasks.
   d. For the Pre-Tasks XML node, do the following:
      i. If the *Object* is an SFC step, then do the following:
         1. If the step is the Initial step, then do the following (note that if the step is not the initial step then no tasks are added):
            A. Insert the following XML nodes of type "Task" with the attribute fields according to the following table.

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Verify that batch executive is running. | Batch executive is running. | *Blank* |
| ... | Load SFC into the controller. | SFC is loaded into the controller. | *Blank* |

Table 7: Initial Step – Load SFC Tasks (Pre-Tasks)

2. If the step is the Initial step or the first step in a *Grouped Logic Block*, then do the following (note that if the step is not the initial step then no tasks are added):
            A. Insert the following XML nodes of type "Task" with the attribute fields according to the following table.

FIG. 15B

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Record step [Step Name] status. | Step [Step Name] is inactive. | *Blank* |
| ... | Record transition [Transition Name] status. Note: the transition name is the next object in *The current test path*. Note, if no transition exists (i.e. there is only one step) then skip this test case. | Transition [Transition Name] is inactive. Note: the transition name is the next object in *The current test path*. Note, if no transition exists (i.e. there is only one step) then skip this test case. | *Blank* |
| ... | Record transition [Transition Name] current value. Note: the transition name is the next object in *The current test path*. Note, if no transition exists (i.e. there is only one step) then skip this test case. | Transition [Transition Name] current value is false. Note: the transition name is the next object in *The current test path*. Note, if no transition exists (i.e. there is only one step) then skip this test case. | *Blank* |

Table 8: Initial Step Tasks (Pre-Tasks)

B.  For each "To Connection" in the step do the following. This information is contained within the *Node* object in Path Discovery.
        I.  Insert the following XML nodes of type "Task" with the attribute fields according to the following table.

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Disable transition [Transition Name] connected from initial step. | Transition [Transition Name] disabled. | *Blank* |

Table 9: Initial Step Tasks – Disable Transitions (Pre-Tasks)

C.  For each Action in the step do the following. This information is contained within the Node object in Path Discovery.
        I.  Insert the following XML nodes of type "Task" with the attribute fields according to the following table.

FIG. 15C

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Record action [Action Name] status. | Action [Action Name] inactive. | Blank |
| ... | [Set state of the parameter that the action manipulates to opposite state.] This information will be gleaned from the .FHX file and Test Plan Description Language. | [State of the parameter that the action manipulates is in the opposite state.] This information will be gleaned from the .FHX file and Test Plan Description Language. | Blank |

Table 10: Initial Step Action Tasks (Pre-Tasks)

i.      If the *Object* is an SFC transition, then do the following:
           1.    There are no pre-tasks for transitions.
    ii.     If the *Object* is a *Grouped Logic Block*, then do the following:
           1.    Create a new *Thread* XML node in the *Test Plan* XML node with the source attribute set to the *Grouped Logic Block* name and the type attribute set to the *Grouped Logic Block* type (serial or parallel).
           2.    Insert the following XML nodes of type "Task" with the attribute fields according to the following table.

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks. | Launch thread for Grouped Logic Block [Grouped Logic Block Name]. | Thread for [Grouped Logic Block Name] has started. | Blank |

Table 11: Grouped Logic Block Tasks (Pre-Tasks)

e.  For the During-Tasks XML node, do the following:
    iii.    If the *Object* is an SFC step, then do the following:
          1.    If the step is the Initial step, then do the following:
               A.    Insert the following XML nodes of type "Task" with the attribute fields according to the following table.

FIG. 15D

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Start SFC. | SFC started. | *Blank* |
| ... | Wait for SFC to be in the "Running" state. | SFC is running. | *Blank* |

Table 12: Initial Step Tasks (During-Tasks)

2.    Insert the following XML nodes of type "Task" with the attribute fields according to the following table.

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Record step [Step Name] status. | Step [Step Name] is active. | *Blank* |

Table 13: Step Tasks (During-Tasks)

3.    For each Action in the step do the following. This information is contained within the Node object in Path Discovery.
        A.    Insert the following XML nodes of type "Task" with the attribute fields according to the following table.

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Wait for action [Action Name] to be active. | Action [Action Name] active. | *Blank* |
| ... | [Execute a command for the action as defined by the Test Plan Description Language.] This information will be gleaned from the .FHX file and Test Plan Description Language. | [Execute a command for the action as defined by the Test Plan Description Language.] This information will be gleaned from the .FHX file and Test Plan Description Language. | *Blank* |

Table 14: Step Action Tasks (During-Tasks)

ii.    If the *Object* is an SFC transition, then do the following:

FIG. 15E

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Wait for [Transition Name] current value to be true. | Transition [Transition Name] current value is true. | *Blank* |

Table 15: Transition Tasks (During-Tasks)

iii.    If the *Object* is a *Grouped Logic Block*, then do the following:
         1.    Insert the following XML nodes of type "Task" with the attribute fields according to the following table.

| Task Nodes ||||
| --- | --- | --- | --- |
| Number Attribute | Test Case Name Attribute | Expected Result Attribute | Actual Result Attribute |
| Set to the next highest number for all Task nodes in Pre-Tasks | Wait for thread for Grouped Logic Block [Grouped Logic Block Name] to complete. | Thread for [Grouped Logic Block Name] is complete. | *Blank* |

Table 16: Grouped Logic Block Tasks (During-Tasks)

f.    For the Post-Tasks XML node, do the following:
        i.    If the *Object* is an SFC step, then do the following:
            1.    Select the node connected 2 nodes down the Current test path from this *Object*.
                A.    If no *Object* exists, then the SFC is going to terminate.
                B.    If an *Object* is selected, then do the following:
                      I.    If the selected *Object* is a step, then do the following:
                            01.    Insert the following XML nodes of type "Task" with the attribute fields according to the following table.

| Task Nodes ||||
| --- | --- | --- | --- |
| Number Attribute | Test Case Name Attribute | Expected Result Attribute | Actual Result Attribute |
| Set to the next highest number for all Task nodes in Post-Tasks | Record step [Step Name of step connected 2 nodes down the Current test path] status. | Step [Step Name of step connected 2 nodes down the Current test path] is inactive. | *Blank* |

Table 17: Step Tasks – Step Info (Post-Tasks)

II.    If the selected *Object* is a *Grouped Logic Block*, then do the following:
                          01.    Insert the following XML nodes of type "Task" with the attribute fields according to the following table.

FIG. 15F

| Task Nodes | | | |
|---|---|---|---|
| Number Attribute | Test Case Name Attribute | Expected Result Attribute | Actual Result Attribute |
| Set to the next highest number for all Task nodes in Post-Tasks | Record thread [Grouped Logic Block Name of thread source connected 2 nodes down the Current test path] status. | Thread [Grouped Logic Block Name of thread source connected 2 nodes down the Current test path] is inactive. | *Blank* |

Table 18: Step Tasks – Grouped Logic Block Info (Post-Tasks)

III. Insert the following XML nodes of type "Task" with the attribute fields according to the following table.

| Task Nodes | | | |
|---|---|---|---|
| Number Attribute | Test Case Name Attribute | Expected Result Attribute | Actual Result Attribute |
| Set to the next highest number for all Task nodes in Post-Tasks | Record transition [Transition Name of transition connected 3 nodes down the path] status. | Transition [Transition Name of transition connected 3 nodes down the path] is inactive. | *Blank* |
| ... | Record transition [Transition Name of transition connected 3 nodes down the path] current value. | Transition [Transition Name of transition connected 3 nodes down the path] current value is false. | *Blank* |

Table 19: Step Tasks – Transition Info (Post-Tasks)

IV. For each "To Connection" for this *Object*, do the following. For step type nodes this information is contained within the *Node* object for the step in Path Discovery. For *Grouped Logic Block* type nodes, there is only one transition that needs to be disabled which is the next node in the path after the *Grouped Logic Block*.
        01. Insert the following XML nodes of type "Task" with the attribute fields according to the following table.

| Task Nodes | | | |
|---|---|---|---|
| Number Attribute | Test Case Name Attribute | Expected Result Attribute | Actual Result Attribute |
| Set to the next highest number for all Task nodes in Post-Tasks | Disable transition [Transition Name connected 3 nodes down in the Current test path from this step]. | Transition [Transition Name connected 3 nodes down in the Current test path from this step] is disabled. | *Blank* |

Table 20: Step Tasks – Disable Transitions (Post-Tasks)

2. Select the node connected 2 nodes down the Current test path from this *Object*.
       A. If no *Object* exists, then the SFC is going to terminate.
       B. If an *Object* is selected, then do the following:
          I. If the selected *Object* is a step, then do the following:

FIG. 15G

01. For each Action in the step 2 nodes down the Current test path from this *Object* do the following. This information is contained within the Node object in Path Discovery.
   1) Insert the following XML nodes of type "Task" with the attribute fields according to the following table.

| Task Nodes | | | |
|---|---|---|---|
| Number Attribute | Test Case Name Attribute | Expected Result Attribute | Actual Result Attribute |
| Set to the next highest number for all Task nodes in Post-Tasks | Record action [Action Name] in step [Step name connected 2 nodes down the Current test path] status. | Action [Action Name] in step [Step name connected 2 nodes down the Current test path] inactive. | *Blank* |
| ... | [Set state of the parameter that the action manipulates to opposite state.] This information will be gleaned from the .FHX file and Test Plan Description Language. | [State of the parameter that the action manipulates is in the opposite state.] This information will be gleaned from the .FHX file and Test Plan Description Language. | *Blank* |

Table 21: Step Tasks – Action Tasks (Post-Tasks)

ii. If the *Object* is an SFC transition, then do the following:
  1. If the "To connection" from the transition does not go to a *Grouped Logic Block* or if the transition is a termination, then do the following:
     A. Insert the following XML nodes of type "Task" with the attribute fields according to the following table.

| Task Nodes | | | |
|---|---|---|---|
| Number Attribute | Test Case Name Attribute | Expected Result Attribute | Actual Result Attribute |
| Set to the next highest number for all Task nodes in Post-Tasks | Enable transition [Transition Name]. | Transition [Transition Name] is enabled. | *Blank* |

Table 22: Transition Tasks (Post-Tasks)

2. If the transition is the termination, then do the following:
     A. Insert the following XML nodes of type "Task" with the attribute fields according to the following table.

| Task Nodes | | | |
|---|---|---|---|
| Number Attribute | Test Case Name Attribute | Expected Result Attribute | Actual Result Attribute |
| Set to the next highest number for all Task nodes in Post-Tasks | Wait for SFC to complete. | SFC is complete. | *Blank* |

Table 23: Termination Transition Tasks (Post-Tasks)

FIG. 15H iii. If the *Object* is a *Grouped Logic Block*, then do the following:
   1. If the *Grouped Logic Block* is a "serial" type, then do the following:
      A. Select the node connected 2 nodes down the Current test path from this *Object*.
         I. If no *Object* exists, then the SFC is going to terminate.
         II. If an *Object* is selected, then do the following:
            01. If the selected *Object* is a step, then do the following:
               1) Insert the following XML nodes of type "Task" with the attribute fields according to the following table.

| Task Nodes | | | |
|---|---|---|---|
| Number Attribute | Test Case Name Attribute | Expected Result Attribute | Actual Result Attribute |
| Set to the next highest number for all Task nodes in Post-Tasks | Record step [Step Name of step connected 2 nodes down the Current test path] status. | Step [Step Name of step connected 2 nodes down the Current test path] is inactive. | Blank |

Table 24: Grouped Logic Block Tasks – Step Info (Post-Tasks)

02. If the selected *Object* is a *Grouped Logic Block*, then do the following:
               1) Insert the following XML nodes of type "Task" with the attribute fields according to the following table.

| Task Nodes | | | |
|---|---|---|---|
| Number Attribute | Test Case Name Attribute | Expected Result Attribute | Actual Result Attribute |
| Set to the next highest number for all Task nodes in Post-Tasks | Record thread [Grouped Logic Block Name of thread source connected 2 nodes down the Current test path] status. | Thread [Grouped Logic Block Name of thread source connected 2 nodes down the Current test path] is inactive. | Blank |

Table 25: Grouped Logic Block Tasks – Grouped Logic Block Info (Post-Tasks)

03. Insert the following XML nodes of type "Task" with the attribute fields according to the following table.

| Task Nodes | | | |
|---|---|---|---|
| Number Attribute | Test Case Name Attribute | Expected Result Attribute | Actual Result Attribute |
| Set to the next highest number for all Task nodes in Post-Tasks | Record transition [Transition Name of transition connected 3 nodes down the path] status. | Transition [Transition Name of transition connected 3 nodes down the path] is inactive. | Blank |
| ... | Record transition [Transition Name of transition connected 3 nodes down the path] current value. | Transition [Transition Name of transition connected 3 nodes down the path] current value is false. | Blank |

Table 26: Grouped Logic Block Tasks – Transition Info (Post-Tasks)

FIG. 15I

04. For each "To Connection" for this *Object*, do the following. For step type nodes this information is contained within the *Node* object for the step in Path Discovery. For *Grouped Logic Block* type nodes, there is only one transition that needs to be disabled with is the next node in the path after the *Grouped Logic Block*.
   1) Insert the following XML nodes of type "Task" with the attribute fields according to the following table.

| Task Nodes ||||
|---|---|---|---|
| Number Attribute | Test Case Name Attribute | Expected Result Attribute | Actual Result Attribute |
| Set to the next highest number for all Task nodes in Post-Tasks | Disable transition [Transition Name connected 3 nodes down in the SFC graph from this step]. | Transition [Transition Name connected 3 nodes down in the SFC graph from this step] is disabled. | Blank |

Table 27: Grouped Logic Block Tasks – Disable Transitions (Post-Tasks)

B. Select the node connected 2 nodes down the Current test path from this *Object*.
   I. If no *Object* exists, then the SFC is going to terminate.
   II. If an *Object* is selected, then do the following:
      01. If the selected *Object* is a step, then do the following:
         1) For each Action in the step 2 nodes down the Current test path from this *Object* do the following. This information is contained within the Node object in Path Discovery.
            a) Insert the following XML nodes of type "Task" with the attribute fields according to the following table.

| Task Nodes ||||
|---|---|---|---|
| Number Attribute | Test Case Name Attribute | Expected Result Attribute | Actual Result Attribute |
| Set to the next highest number for all Task nodes in Post-Tasks | Record action [Action Name] in step [Step name connected 2 nodes down the path] status. | Action [Action Name] in step [Step name connected 2 nodes down the path] inactive. | Blank |
| ... | [Set state of the parameter that the action manipulates to opposite state.] This information will be gleaned from the .FHX file and Test Plan Description Language. | [State of the parameter that the action manipulates is in the opposite state.] This information will be gleaned from the .FHX file and Test Plan Description Language. | Blank |

Table 28: Grouped Logic Block – Action Tasks (Post-Tasks)

12. Select the next *Thread* that does not have any child *Objects* (i.e. has not been processed). Proceed to step 10.
13. If all *Thread* objects have child *Objects* (i.e. all *Threads* have been processed), then proceed to step 1.
14. End program.

FIG. 15J

1. SFC is made up of Nodes.
2. 2 types of Nodes: Steps and Transitions.
3. Connections link the Nodes.
4. All Nodes are connected.
5. A Node cannot connect to itself.
6. The root Node is a Step.
7. All Nodes are reachable from the root Node.
8. Steps can only connect to Transitions.
9. Transitions can only connect to Steps.
10. SFC must contain at least one Step and one Transition.
11. The end Node is a Transition.
12. The end Node does not have a To connection.
13. 2 sets of Connections: From and To.
14. From is the reverse ordering of To.
15. Steps that share the same Transition in the From connectors implies that there exists a single Transition with the same number of connections in the From connectors that are able to reach the Steps in the From connectors.
16. Transitions that have a multiple number of connections in the To connectors implies that there exists the same number of Steps in the To connectors that connect to a single Transition that are able to reach the Transition in the From connectors.
17. For all Multi-number To Transitions reachable in the From connectors from Multi-number From Transitions, there are no cases where a number of Nodes less than the multi-number are included in all From connector paths. (I.e. if doing 3-way parallel divergence, the From paths must go through unique nodes).

FIG. 16

METHODS, APPARATUS AND ARTICLES OF MANUFACTURE TO TEST BATCH CONFIGURATIONS

FIELD OF THE DISCLOSURE

This disclosure relates generally to batch configurations and, more particularly, to methods, apparatus and articles of manufacture to test batch configurations.

BACKGROUND

Batches are a type of process control system configuration that may be used to run repetitive and/or sequential operations to manufacture a product. During the life cycle of a process plant, a process control system may need to be replaced, fixed, patched, upgraded, etc. However, any change of a process control system has the potential to disrupt operation of the process plant and/or batch configurations.

SUMMARY

Example methods, apparatus and articles to test batch configurations are disclosed. A disclosed example method includes identifying, using a processor, an execution path through a batch configuration of a process control system, generating a test plan for the execution path, stimulating the process control system to execute the test plan, and recording a result of the test plan.

A disclosed example apparatus includes a path discoverer to identify an execution path through a batch configuration of a process control system, a test plan creator to generate a test plan for the execution path, and a test plan executor to stimulate the process control system to execute the test plan, and record a result of the test plan.

BRIEF DESCRIPTION OF THE DRAWINGS

FIG. 5 is an interaction table corresponding to the example path highlighted in FIG. 4.

FIG. 6 is an example test plan for the example path highlighted in FIG. 4.

FIG. 7 is an example interaction mapping table.

FIG. 8 is an example result of the example test plan of FIG. 6.

FIG. 12 is example pseudo-code that may be implemented to identify paths through a batch configuration.

FIGS. 13A-E is example pseudo-code that may be implemented to merge diverging and converging paths through a batch configuration.

FIG. 14 is example pseudo-code that may be implemented to generate a human-readable and/or a machine-readable batch interaction table.

FIGS. 15A-J is example pseudo-code that may be implemented to generate a batch test plan.

FIG. 16 is an example set of rules that can be used to define and/or navigate an SFC.

DETAILED DESCRIPTION

Because of the complexity of modern process control systems and the limitless number of process plant configurations and/or batch configurations, it can be difficult to detect any defects that may be present before a process control system and/or batch configuration fix, patch, upgrade, etc. is released. For example, such undetected defects may only become apparent after and/or when the process control system and/or batch configuration is operated in connection with an actual process plant. To alleviate the need to replace, modify, patch, update and/or upgrade their process control system(s) and/or batch configurations, some customers have instead elected to isolate their process control system(s) from other device(s) and/or network(s). While such actions may reduce the potential for disruptions, it also prevents process engineers from taking advantage of the features and/or capabilities available in newer versions of a process control system and/or batch configuration.

In general, the example apparatus, methods, and articles of manufacture disclosed herein may be used to test batch configurations. In particular, the example apparatus, methods, and articles of manufacture disclosed herein may be used to automatically identify all possible execution paths through a batch configuration, automatically generate test plans for any or all of those possible execution paths, and/or to automatically test any or all of those possible execution paths. A batch configuration may be tested with a new and/or updated process control system before the new and/or updated process control system is used to control the customer's process plant. A batch configuration may, additionally or alternatively, be tested against a project design objective and/or functional test case objective.

By automatically and/or systematically testing batch configurations, a number of advantages may be realized. Automatic batch configuration testing can reduce the number of disruptive events in process plants by facilitating the identification of software defects that may only be detected with realistic test scenarios. Automatic batch configuration testing can also reduce the time and/or effort required to thoroughly test a batch configuration, as the behavior of the batch configuration can be automatically determined and/or verified. Automatic batch configuration testing can further enable substantially more test scenarios to be executed and/or verified. Automatic batch configuration testing can also enable testing without the need for process models, which can be expensive and/or time consuming to create for highly regulated industries. Additionally, automatic batch testing can increase customer confidence in deploying process control system upgrades, and can reduce the cost of supporting process control systems.

Figure 1:
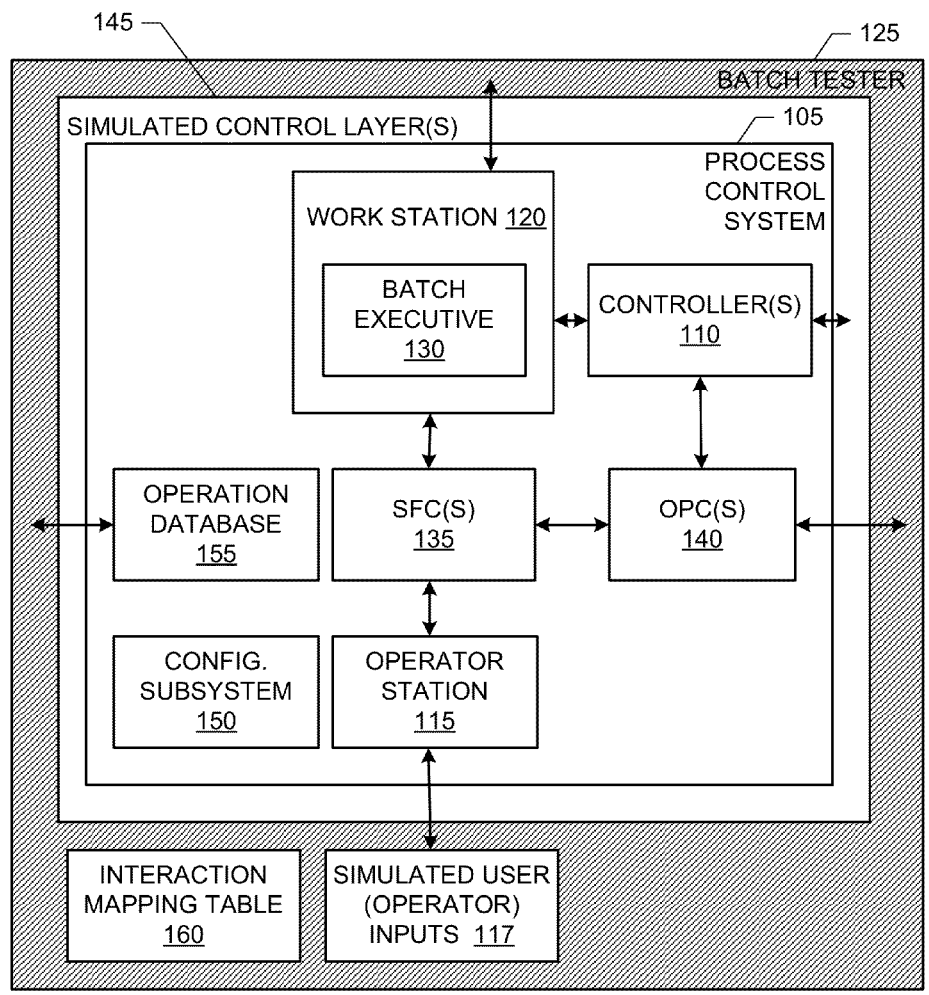
FIG. 1 is a schematic illustration of an example system to test batch configurations for process control systems.

FIG. 1 illustrates an example system 100 to test batch configurations for a process control system 105 such as the DeltaV™ process control system sold by Fisher-Rosemount Systems, Inc., an Emerson Process Management company. The example process control system 105 of FIG. 1 includes one or more process controllers 110, one or more operator stations 115, and one or more application and/or work stations 120. An example process controller 110 is the DeltaV controller sold by Fisher-Rosemount Systems, Inc., an Emerson Process Management company. The example process controller(s) 110, the example operator station 115 and the example work station 120 of FIG. 1 are communicatively coupled via a bus and/or local area network (not shown), which is commonly referred to as an application control network. The local area network may be implemented using any desired communication medium(s) and/or protocol(s). For example, the local area network may be based on a wired and/or a wireless Ethernet communication scheme. However, any other suitable communication medium(s) and/or protocol (s) could be used.

The example operator station 115 of FIG. 1 allows a process plant operator to review and/or operate one or more operator display screens, graphical user interfaces and/or applications that enable the process plant operator to view process plant variables, view process plant states, view process plant conditions, view process plant alarms, and/or to provide user inputs such as those used to change process plant settings (e.g., set points and/or operating states, clear alarms, silence alarms, etc.). Such screens and/or applications are typically designed and/or implemented by process configuration engineers. As discussed in more detail below, an example batch tester 125 may simulate user and/or operator inputs 117 to the operator station 115 to stimulate, direct, force and/or otherwise cause the process control system 105 to execute a particular, selected and/or chosen path through a batch configuration.

The example work station 120 of FIG. 1 may be configured to implement any number and/or type(s) of process control application(s) and/or function(s). In the illustrated example of FIG. 1, the work station 120 is configured to implement, among possibly other applications and/or functions, the DeltaV Batch Executive 130 sold by Fisher-Rosemount Systems, Inc., an Emerson Process Management company. The example Batch Executive 130 of FIG. 1 carries out batch procedures, which are defined by one or more sequential function charts (SFCs) 135 by controlling, sequencing and/or coordinating the inputs, outputs and/or operations of one or more phase classes implemented by the example controller(s) 110. The example SFC(s) 135 of FIG. 1 are graphical representations of the actions and/or processes, and are defined and/or structured in accordance with any past, present and/or future standard(s) and/or recommendation(s) such as the International Society of Measurement and Control (ISA) S88 standard.

Figure 17:
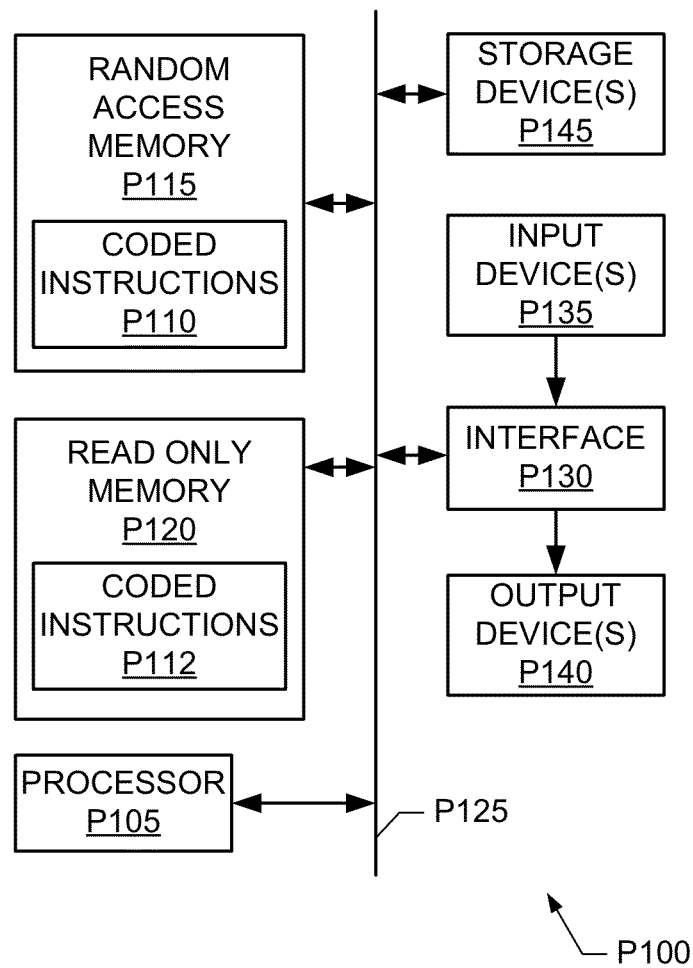
FIG. 17 is a schematic illustration of an example processor platform that may be used and/or programmed to carry out the example processes of FIGS. 10 and/or 11, the example pseudo-code of FIGS. 12, 13A-E, 14 and/or 15A-J, and/or to perform testing of batch configurations.

The example stations 115 and 120 of FIG. 1 may be implemented using any suitable computing systems and/or processing systems such as the example processor platform P100 of FIG. 17. The example stations 115 and 120 could, for example, be implemented using single-processor and/or multi-processor computers and/or computer workstations.

To enable the example batch tester 125 of FIG. 1 to interact with the example Batch Executive 130 and/or the example controller(s) 110, the example process control system 105 of FIG. 1 includes any number and/or type(s) of object linking and embedding (OLE) for process control (OPC) controllers 140. An example OPC controller 140 is the DeltaV OPC Server sold by Fisher-Rosemount Systems, Inc., an Emerson Process Management company In the illustrated example of FIG. 1, lower layer(s) 145 of the control system hierarchy (e.g., equipment modules, control modules, input/output devices, field devices, etc.) are simulated and/or modeled rather than being executed on an actual process control field devices. In some examples, the simulated control layer(s) 145 also simulate and/or model the process plant controlled by the example process control system 105. Any number and/or type(s) of method(s), logic, tool(s), application(s) and/or device(s) such as the DeltaV SimulatePro application sold by Fisher-Rosemount Systems, Inc., an Emerson Process Management company may be used to implement the example simulated control layer(s) 145 of FIG. 1.

To configure control components (e.g., the example controller(s) 110, the example operator station 115 and/or the example work station 120), the example process control system 105 of FIG. 1 includes a process control system configuration subsystem 150. The example configuration subsystem 150 of FIG. 1 loads, configures, commissions and/or programs the actual (i.e., physical) process control components of the process control system 105 based on the contents of an operation database 155. The example configuration subsystem 150 and the example operation database 155 of FIG. 1 are a part of the DeltaV process control system sold by Fisher-Rosemount Systems, Inc., an Emerson Process Management company. The example operation database 155 of FIG. 1 may be generated, defined, specified and/or populated using other tools and/or interfaces (not shown) of the DeltaV process control system such as the DeltaV Configuration Software Suite sold by Fisher-Rosemount Systems, Inc., an Emerson Process Management company. In some examples, the example SFC(s) 135 are stored in the example operation database 155.

While FIG. 1 illustrates an example process control system 105 on which the example apparatus, methods, and articles of manufacture to test batch configurations may be advantageously employed, persons of ordinary skill in the art will readily appreciate that the apparatus, methods, and articles of manufacture disclosed herein may, if desired, be advantageously employed in other process control systems of greater or less complexity (e.g., having more than one controller, across more than one geographic location, etc.) than the illustrated example of FIG. 1. Moreover, while not shown in FIG. 1 for clarity of illustration, there may be any number and/or type(s) of additional and/or alternative devices, components and/or systems included in a process plant and/or a process control system. For example, a process plant and/or a process control system may include and/or implement a firewall, a switch, a router, a hub, a power supply, and/or any other devices managed and/or controllable by a process control system, such as the DeltaV process control system sold by Fisher-Rosemount Systems, Inc., an Emerson Process Management company.

To test batch configurations, the example system 100 of FIG. 1 includes the example batch tester 125. The example batch tester 125 of FIG. 1 tests a batch configuration, program and/or script to verify that the process control system 105 executes the batch as intended. To verify the execution of a batch, the example batch tester 125 compares one or more results of the batch to execute one or more benchmarks. Example benchmarks include, but are not limited to, one or more results collected from a prior execution of the batch on a different version of the process control system 105 and/or a different version of process control system software, and/or objective, expected and/or anticipated behavior(s) and/or result(s) defined and/or specified in a project configuration document and/or a functional test document. The example batch tester 125 tests all layers of the batch configuration, program and/or script (e.g., procedures, unit procedures, operations and/or phase classes) and controller interface logic. Additionally or alternatively, the batch tester 125 verifies that the execution time for a batch is not improperly delayed, that a batch does not go to a "complete" state prematurely, that the batch acquires and/or releases equipment as intended, that commands do not return errors, that the batch correctly recovers from errors, and/or that operator interactions are implemented as intended. The batch tester 125 ensures that commands of the SFC(s) 135 execute correctly and/or non-passively on the controller(s) 110 by, for example forcing a change of state in the controller(s) 110 prior to the controller(s) 110 setting the same state. An example manner of implementing the example batch tester 125 of FIG. 1 is disclosed below in connection with FIG. 2.

The example batch tester 125 of FIG. 1 analyzes a batch configuration, scripts and/or programs to identify all possible execution paths through the batch. The example batch tester 125 uses knowledge of batch script hierarchies and SFC constructs as defined by the S88 standard to determine all possible execution paths through a batch. The example batch tester 125 displays the identified list of execution paths to a user. For each of the execution path(s) selected by the user, the batch tester 125 generates a test plan that forces, stimulates and/or otherwise causes the process control system 105 and/or the simulated control layer(s) 145 to follow the execution path being tested. The example batch tester 125 generates a test plan by compiling a list of all the interactions needed to stimulate, force and/or otherwise cause the process control system 105 and/or the simulated control layer(s) 145 to follow a particular execution path through the batch. An example test plan that may be generated by the example batch tester 125 is human-readable (e.g., constructed in accordance with an eXtensible Markup Language (XML)) and executable programmatically. Results of the execution of each execution path are presented to the user and/or saved in a log file for subsequent comparison with appropriate benchmarks and/or objectives.

Figure 3:
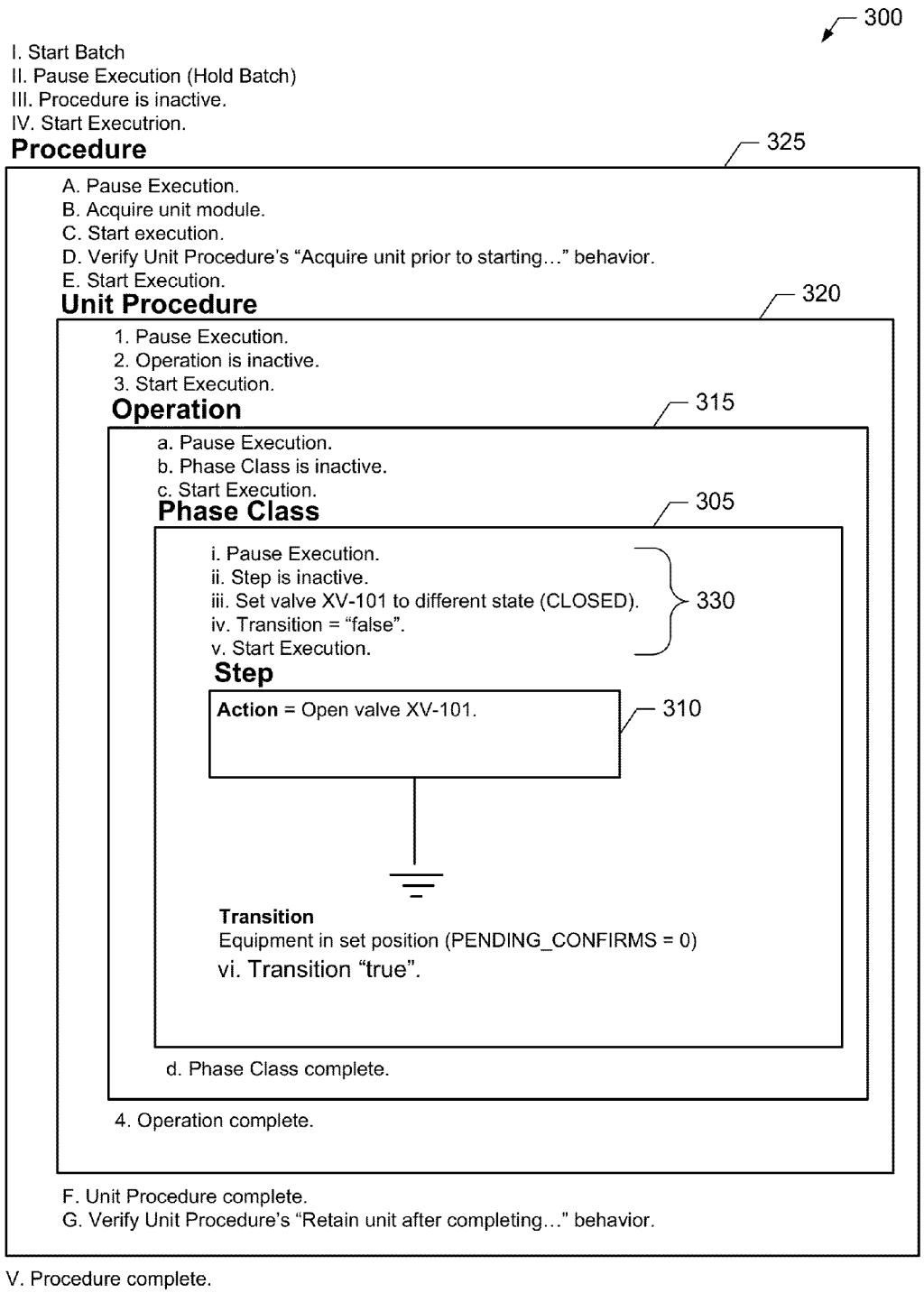
FIG. 3 illustrates an example batch hierarchy.

The example batch tester 125 of FIG. 1 executes all levels of a batch configuration, script and/or program as defined by the S88 standard and, thus, navigates through the batch hierarchy to identify all possible execution paths through the batch. FIG. 16 illustrates an example list of rules and/or constructs that define SFCs and can be used by the example batch tester 125 to identify execution paths through a batch. FIG. 3 illustrates an example batch hierarchy 300 for a phase class 305 having a single step 310 within a single operation 315 within a single unit procedure 320 with a single procedure 325. In the illustrated example of FIG. 3, the test shown around each box (e.g., text 330 around box 310) indicates the commands used to interact with each layer of the batch.

Figure 4:
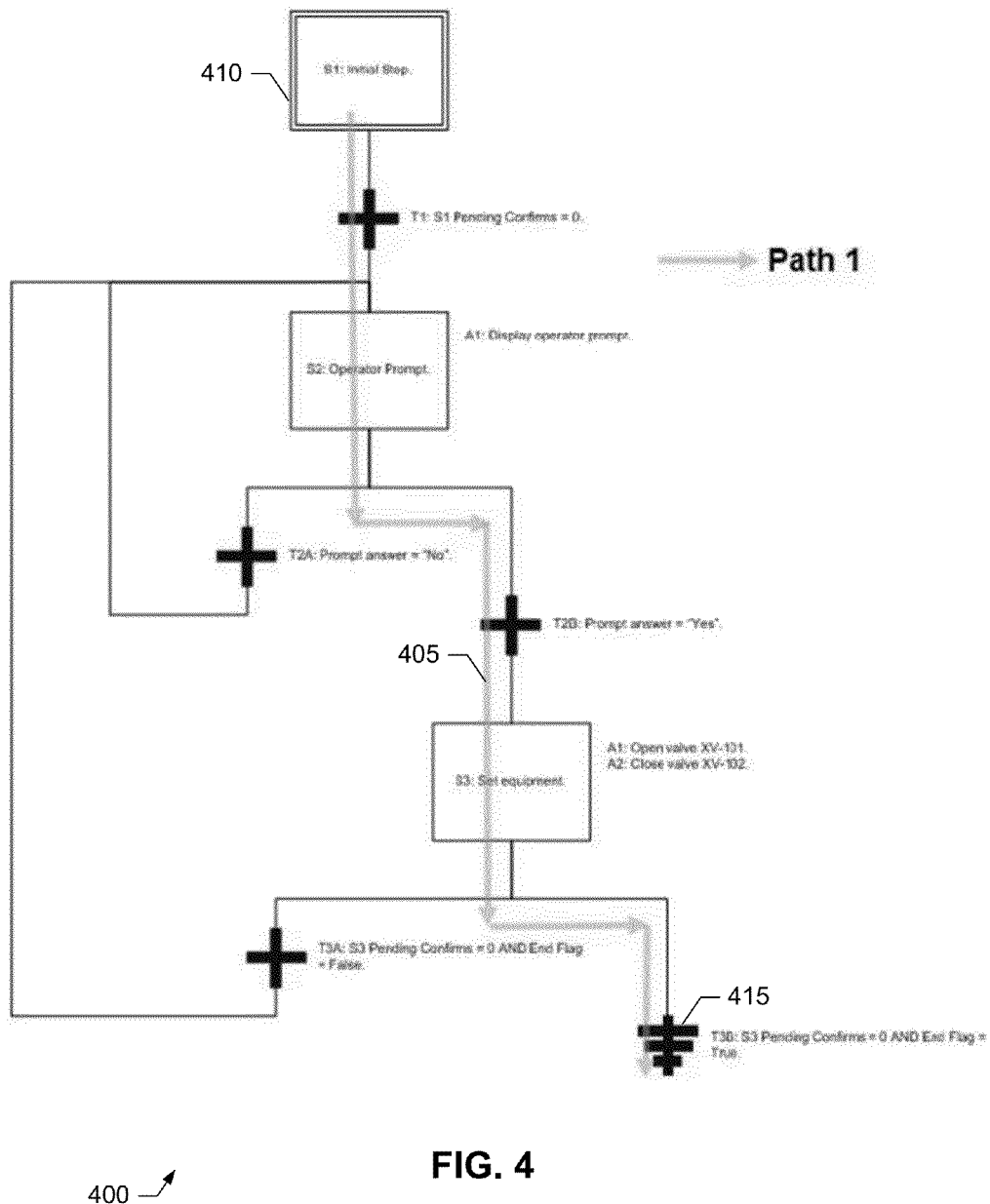
FIG. 4 illustrates an example sequential function chart (SFC) representing a portion of a batch.

FIG. 4 illustrates an example SFC 400 representing a portion of a batch. The example batch tester 125 of FIG. 1 navigates the example SFC 400 to identify each execution path through the SFC. An example execution path is designated at reference numeral 405 in FIG. 4. As shown in FIG. 4, the execution path 405 starts at an initial set 410 and continues to a termination 415. The example execution path 405 in FIG. 4 can be represented by $$S1 \rightarrow T1 \rightarrow S2 \rightarrow T2B \rightarrow S3 \rightarrow T3B$$

where the "→" symbol represents "go to." Typically, a batch will include multiple SFC layers and, thus, path discovery through the batch will be more complicated, but path navigation uses the same methodology and/or logic as for a single SFC. An example process that can be carried out by the example batch tester 125 to discover and/or identify the execution paths in a batch and/or SFC is disclosed below in connection with FIG. 11. Example pseudo-code that may be implemented by the example batch tester 125 to discover and/or identify execution paths through a batch and/or SFC is shown in FIGS. 12, 13A-E and 14.

For each execution path (e.g., the example execution path 405 of FIG. 4) to be tested, the example batch tester 125 of FIG. 1 generates a list of the commands needed to manipulate, stimulate, force and/or otherwise cause execution along a presently considered path. The list of commands includes the inputs required to follow an execution path and the outputs manipulated by the batch along that path.

An example interaction table 500 representing a list of commands that manipulate, stimulate, force and/or otherwise cause execution along the example execution path 405 of FIG. 4 is shown in FIG. 5. The example inputs of FIG. 5 come from three different sources: human interactions, signals received from the simulated control layer(s) 145 (e.g., "valve XV-101 is open") and/or signals received from an external program control (e.g., "start SFC"). The example outputs of FIG. 5 are signals to the simulated control layer(s) 145 (e.g., "open valve XV-101"), signals to an external program, and/or information about the current state of the batch (e.g., "Step S1 is Active"). In the example interaction table 500 of FIG. 5, the # column 505 represents the sequence number of the command, the input/output column 510 represents whether the command is received (input) or given (output), the agent column 515 represents who executes the command, and the type column 520 represents the type of the agent 515.

To execute a batch path, the example batch tester 125 sends commands to change the state of the batch and/or to receive feedback about what operation(s) occurred. Accordingly, the example batch tester 125 of FIG. 1 augments the example interaction table 500 of FIG. 5 with additional commands, which are shown with shading in the example test plan 600 of FIG. 6 (two of which are designated at reference numerals 605 and 610). The additional commands added by the batch tester 125 allow the example batch tester 125 to synchronize itself with the batch. As shown in FIG. 6, the example batch tester 125 verifies each operation, behavior and/or transition of the batch, including the action(s) at each step. As such, each step and/or transition has pre-conditions and/or post-conditions that are setup and/or recorded by the batch tester 125, as shown in FIG. 6. Example pseudo-code that may be implemented by the example batch tester 125 of FIG. 1 to create a test plan is shown in FIGS. 15A-J.

As shown conceptually in FIG. 1, the example batch tester 125 envelopes the environment in which the batch executes and provides all the necessary feedback for the batch. For example, an operator no longer provides inputs and/or responses to the batch. Instead, the batch tester 125 provides the simulated inputs 117. However, as shown in FIG. 1, because the lower control layer(s) are simulated by the simulated control layer(s) 145, the example batch tester 125 need not provide and/or record the signals between the controller(s) 110 and the simulated control layer(s) 145.

To allow the example batch tester 125 of FIG. 1 to determine the commands used to exchange data with the process control system 105, the example batch tester 125 uses an interaction mapping table 160 provided by, for example, an engineer of the process control system 105. The example interaction mapping table 160 of FIG. 1 defines and/or specifies how data and/or commands are written to and/or received from the process control system 105. An example interaction mapping table 160 is shown in FIG. 7. The example batch tester 125 of FIG. 1 uses the interaction mapping table 160 to identify, for each step in a test plan (e.g., the example test plan 600 of FIG. 6), a particular command to execute that step.

FIG. 8 illustrates example test result log 800 generated by the example batch tester 125 of FIG. 1 for the example test path 405 of FIG. 4. As each test path is executed, the batch tester 125 updates and/or augments the log file. As shown, the log 800 can be used to determine test coverage and can be easily navigated. Whether a batch path executed correctly can be determined by, for example, comparing an associated portion of the log 800 with the contents of another log. As described above, another log may, for example, be generated by test a batch using another version of process control system software. Moreover, the log 800 and/or portion thereof may be compared with a project design document and/or functional test objectives. In such examples, the project design document and/or the functional test objectives (and/or portions thereof) are stored using a format and/or data structures that are accessible and/or readable by the batch tester 125 to enable comparison(s) with the log 800 and/or portions thereof.

Figure 2:
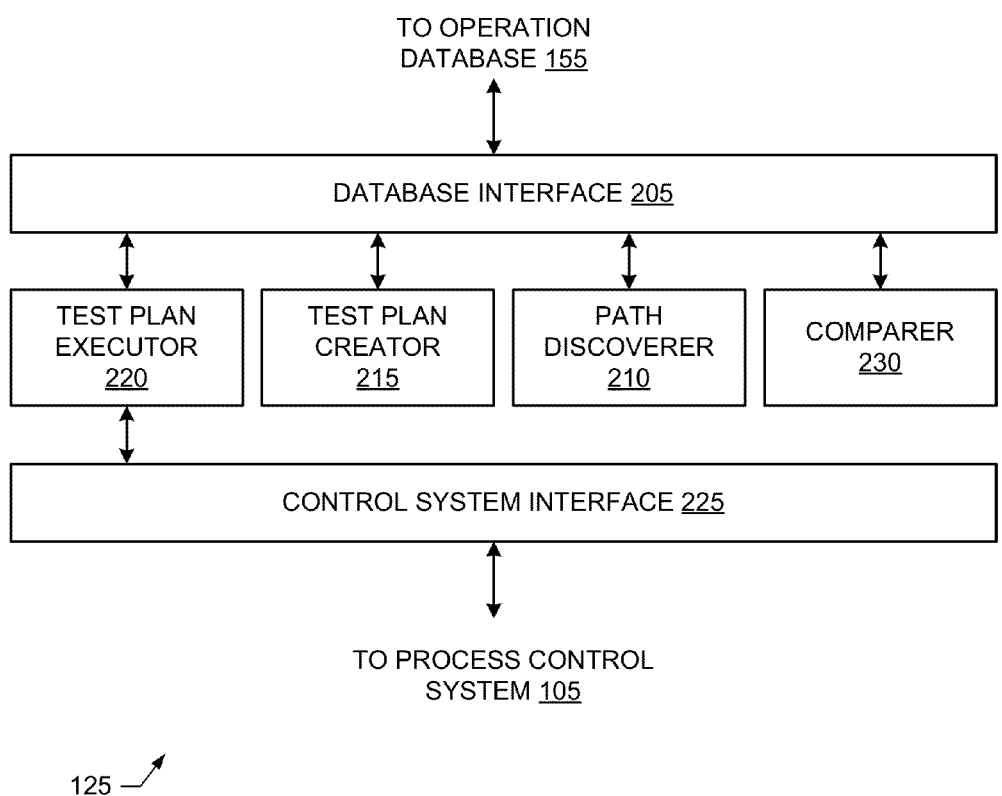
FIG. 2 illustrates an example manner of implementing the example batch tester of FIG. 1.

FIG. 2 illustrates an example manner of implementing the example batch tester 125 of FIG. 1. To interface with the example operation database 155 of FIG. 1, the example batch tester 125 of FIG. 1 includes a database interface 205. Using any number and/or type(s) of message(s), protocol(s), logic, method(s) and/or application programming interface(s), the example database interface 205 of FIG. 2 enables other portions of the batch tester 125 to query for and/or obtain information (e.g., a batch configuration, program and/or script) from the operation database 155, and/or to store results (e.g., a log file) in the operation database 155.

To identify the paths through a batch, the example batch tester 125 of FIG. 2 includes a path discoverer 210. The example path discoverer 210 of FIG. 2 traces and/or executes all levels of a batch configuration, script and/or program as, for example, defined by the S88 standard and, thus, navigates through the batch hierarchy to identify all possible execution paths through the batch, as disclosed above in connection with FIGS. 1, 3, 4 and 16.

To create test plans such as the example test plan 600 of FIG. 6, the example batch tester 125 of FIG. 2 includes a test plan creator 215. For each batch execution path to be tested, the example test plan creator 215 of FIG. 2 generates a list of the commands needed to manipulate, stimulate, force and/or otherwise cause execution of a presently considered path. The list of commands includes the inputs required to follow an execution path and the outputs manipulated by the batch along that path. The example test plan creator 215 also inserts additional commands to allow a test plan executor 220 to change the state of the batch and/or to receive feedback about what operation(s) occurred.

To execute test plans, the example batch tester 125 of FIG. 2 includes the example test plan executor 220. Using an interaction mapping table such as the example table 160 of FIG. 7, the example test plan executor 220 of FIG. 2 executes each command of a test plan. As the test plan is executed, the example test plan executor 220 stores results of and/or state information obtained during execution of the test plan into a log file such as the example log file 800 of FIG. 8.

To allow the example test plan executor 220 to interact with the example process control system 105 of FIG. 1, the example batch tester 125 of FIG. 2 includes a control system interface 225.

To verify test results, the example batch tester 125 of FIG. 2 includes a comparer 230. Using any number and/or type(s) of method(s), logic(s) and/or criterion, the example comparer 230 of FIG. 2 compares a log file generated by the example test plan executor 220 to other log files previously generated by the test plan executor 220. For example, the comparer 230 may verify that the batch reaches the intended state(s) and that the intended outputs of the process control system 105 occurred. Additionally or alternatively, the comparer 230 can compare the log file and/or portions thereof compared with a project design document and/or functional test objectives. In such examples, the project design document and/or the functional test objectives (and/or portions thereof) are stored using a format and/or data structures that are accessible and/or readable by the comparer 230 to enable comparison(s) with the log file and/or portions thereof.

While an example manner of implementing the example batch tester 125 of FIG. 1 is shown in FIG. 2, one or more of the interfaces, data structures, elements, processes and/or devices illustrated in FIG. 2 may be combined, divided, re-arranged, omitted, eliminated and/or implemented in any other way. Further, the example database interface 205, the example path discoverer 210, the example test plan creator 215, the example test plan executor 220, the example control system interface 225 and/or, more generally, the example batch tester 125 of FIGS. 1 and 2 may be implemented by hardware, software, firmware and/or any combination of hardware, software and/or firmware. Thus, for example, any of the example database interface 205, the example path discoverer 210, the example test plan creator 215, the example test plan executor 220, the example control system interface 225 and/or, more generally, the example batch tester 125 may be implemented by the example processor platform P100 of FIG. 17 and/or one or more circuit(s), programmable processor(s), application-specific integrated circuit(s) (ASIC (s)), programmable logic device(s) (PLD(s)), field-programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example database interface 205, the example path discoverer 210, the example test plan creator 215, the example test plan executor 220, the example control system interface 225 and/or, more generally, the example batch tester 125 is hereby expressly defined to include a tangible article of manufacture such as a tangible computer-readable medium storing the firmware and/or software. Further still, the example batch tester 125 may include interfaces, data structures, elements, processes and/or devices instead of, or in addition to, those illustrated in FIG. 2, and/or may include more than one of any or all of the illustrated interfaces, data structures, elements, processes and/or devices.

As used herein, the term tangible computer-readable medium is expressly defined to include any type of computer-readable medium and to expressly exclude propagating signals. As used herein, the term non-transitory computer-readable medium is expressly defined to include any type of computer-readable medium and to exclude propagating signals. Example tangible and/or non-transitory computer-readable media include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 17.

Figure 9:
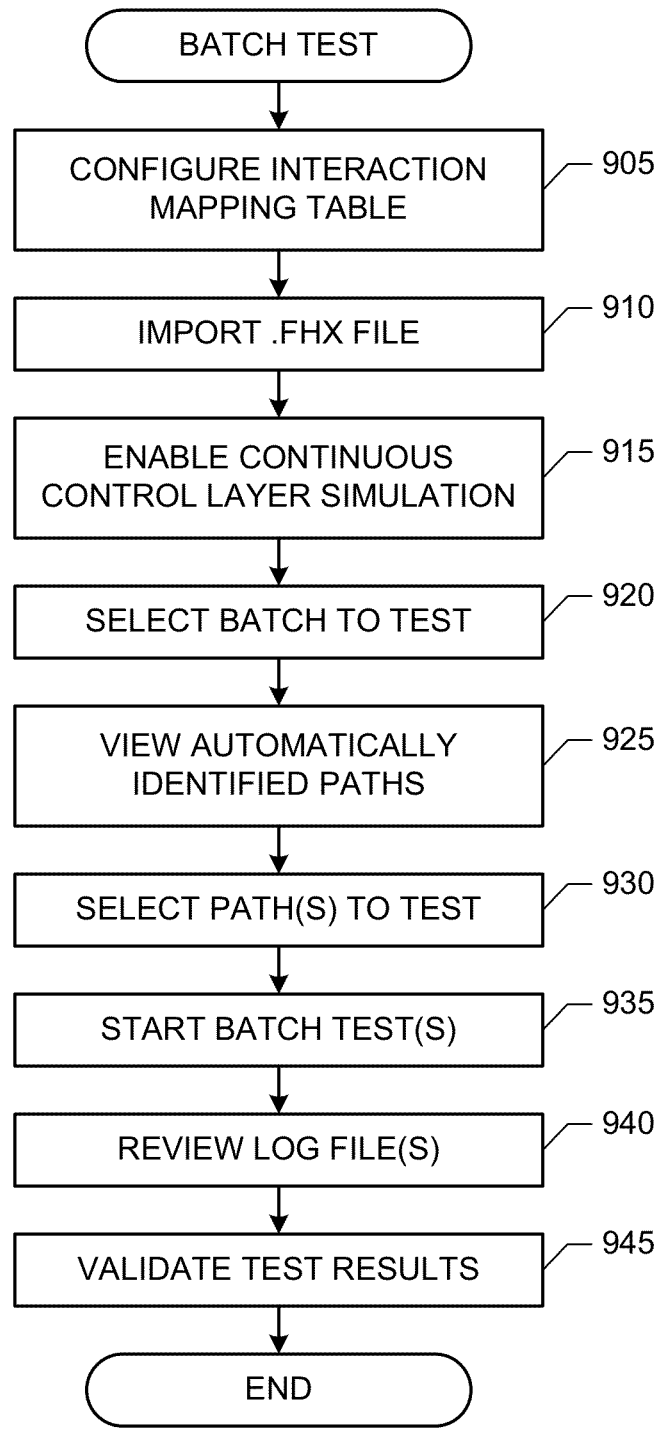
FIG. 9 is a flowchart representative of an example process that may be carried out to test batch configurations using the example batch tester of FIGS. 1 and 2.

FIG. 9 is a flowchart representing an example process that may be carried out by, for example, an engineer and/or process plant operator to test a batch configuration for a process control system. The example process of FIG. 9 begins with a user configuring an interaction mapping table such as the example table 160 of FIG. 7 for a process control system such as the example process control system 105 of FIG. 1 (block 905). The user imports a configuration file such as a DeltaV .FHX file containing one or more batch configurations (block 910). The user enables the simulated control layer(s) 145 (block 915) and selects a batch to test (block 920). The user reviews the list of execution paths through the batch that were automatically identified by the batch tester 125 (block 925) and selects one or more of the identified execution paths for testing (block 930). The user starts execution of the batch test(s) (block 935) and reviews the results of the batch test(s) (block 940). The user validates batch test results by, for example, comparing a log file to another log file, and/or comparing results in the log file to a project design document and/or to a functional test document (block 945).

Figure 10:
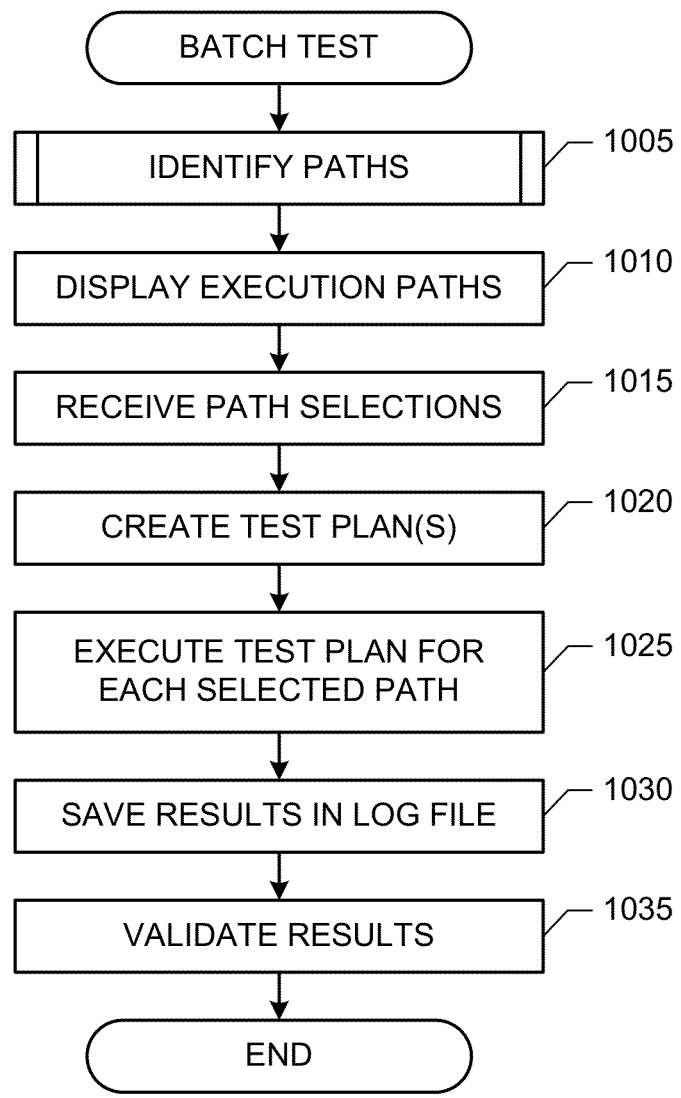
FIGS. 10 and 11 are flowcharts representative of example processes that may be carried out to implement the example batch testers of FIGS. 1 and 2, and/or to test batch configurations for process control systems.
Figure 11:
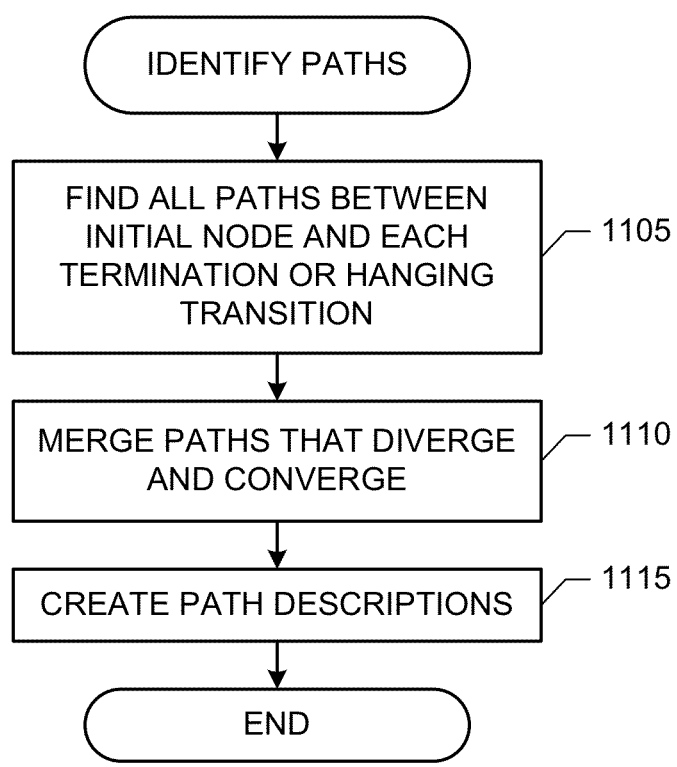

FIGS. 10 and 11 are flowcharts representative of example processes that may be carried out to implement the example batch tester 125 of FIGS. 1 and 2. A processor, a controller and/or any other suitable processing device may be used, configured and/or programmed to carry out the example processes of FIGS. 10 and/or 11. For example, the example processes of FIGS. 10 and/or 11 may be embodied in coded or machine-readable instructions stored on a tangible computer-readable medium. Machine-readable instructions comprise, for example, instructions that cause a processor, a computer and/or a machine having a processor to perform one or more particular processes. Alternatively, some or all of the example processes of FIGS. 10 and/or 11 may be implemented using any combination(s) of ASIC(s), PLD(s), FPLD(s), FPGA(s), discrete logic, hardware, firmware, etc. Also, some or all of the example processes of FIGS. 10 and/or 11 may be implemented manually or as any combination of any of the foregoing techniques, for example, any combination of firmware, software, discrete logic and/or hardware. Further, many other methods of implementing the example operations of FIGS. 9, 10 and/or 11 may be employed. For example, the order of execution of the blocks may be changed, and/or one or more of the disclosed blocks may be changed, eliminated, sub-divided, or combined. Additionally, the blocks of any or all of the example processes of FIGS. 9, 10 and/or 11 may be carried out sequentially and/or carried out in parallel by, for example, different users, separate processing threads, processors, devices, discrete logic, circuits, etc.

The example process of FIG. 10 begins with the example path discoverer 210 identifying the execution paths through a batch (block 1005). The path discoverer 210 may identify the execution paths by, for example, carrying out the example process of FIG. 11 and/or by implementing the example pseudo-code of FIGS. 12, 13A-E and 14. The path discoverer 210 displays the list of identified execution paths for review by a user (block 1010). The example test plan creator 215 receives from the user a selection of one or more of the displayed execution paths (block 1015) and, for each selected execution path, generates a test plan such as the example test plan 600 of FIG. 6 (block 1020). The example test plan creator 215 creates the test plan(s) by, for example, implementing the example pseudo-code of FIGS. 15A-J.

The example test plan executor 220 executes each of the test plans created by the test plan creator 215 (block 1025) and stores the results in a log file (block 1030). As directed by a user, the example comparer 230 compares all or any part of the log file to one or more other log files to verify and/or validate the results of the executed batch paths (block 1035). Control then exits from the example process of FIG. 10.

The example process of FIG. 11 may be carried out to identify the paths through a batch. The example process of FIG. 11 begins with the path discoverer 210 identifying all paths through the batch that start with an initial node and end on any termination or hanging transition by, for example, implementing the example pseudo-code of FIG. 12 (block 1105). The path discoverer 210 identifies and merges paths that diverge and converge by, for example, implementing the example pseudo-code of FIGS. 13A-E (block 1110). The path discoverer 210 creates path descriptions for the merged paths by, for example, implementing the example pseudo-code of FIG. 14 (block 1115). Control then exits from the example process of FIG. 11.

FIGS. 12, 13A-E, 14 and 15A-J are pseudo-code representative of example processes that may be carried out to implement the example batch tester 125 of FIGS. 1 and 2 and, in particular, the example path discoverer 210 and the example test plan creator 215 of FIG. 2. A processor, a controller and/or any other suitable processing device may be used, configured and/or programmed to carry out the example pseudo-code of FIGS. 12, 13A-E, 14 and/or 15A-J. For example, the example pseudo-code of FIGS. 12, 13A-E, 14 and/or 15A-J may be embodied in coded or machine-readable instructions stored on a tangible computer-readable medium. Machine-readable instructions comprise, for example, instructions that cause a processor, a computer and/or a machine having a processor to perform one or more particular processes. Alternatively, some or all of the example pseudo-code of FIGS. 12, 13A-E, 14 and/or 15A-J may be implemented using any combination(s) of ASIC(s), PLD(s), FPLD (s), FPGA(s), discrete logic, hardware, firmware, etc. Also, some or all of the example pseudo-code of FIGS. 12, 13A-E, 14 and 15A-J may be implemented manually or as any combination of any of the foregoing techniques, for example, any combination of firmware, software, discrete logic and/or hardware. Further, many other methods of implementing the example operations of FIGS. 12, 13A-E, 14 and/or 15A-J may be employed. For example, the order of execution of blocks, portions, statements, and/or expressions of the pseudo-code may be changed, and/or one or more of the disclosed blocks, portions, statements and/or expressions may be changed, eliminated, sub-divided, or combined. Additionally, the blocks, portions, statements and/or expressions of any or all of the example pseudo-code of FIGS. 12, 13A-E, 14 and 15A-J may be carried out sequentially and/or carried out in parallel by, for example, different users, separate processing threads, processors, devices, discrete logic, circuits, etc.

FIG. 17 is a block diagram of an example processor platform P100 that may be used and/or programmed to implement the disclosed example batch testers 125 and/or to execute any or all of the example machine-accessible instructions and/or processes disclosed herein. One or more general-purpose processors, processor cores, microcontrollers, etc may be used to implement the processor platform P100. The processor platform P100 can be, for example, a server, a personal computer, an embedded controller, and/or any other type of computing device.

The processor platform P100 of the instant example includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may be programmed to carry out the example processes of FIGS. 10 and 11, and/or the example pseudo-code of FIGS. 12, 13A-E, 14 and/or 15A-J. Thus, the coded instructions P110, P112 may represent the example processes of FIGS. 10 and 11, and/or the example pseudo-code of FIGS. 12, 13A-E, 14 and/or 15A-J.

The processor P105 is in communication with the main memory including a ROM P110 and the RAM P115 via a bus P125. The RAM P115 may be implemented by Synchronous Dynamic Random Access Memory (SDRAM), Dynamic Random Access Memory (DRAM), RAMBUS Dynamic Random Access Memory (RDRAM) and/or any other type of RAM device. The ROM P110 may be implemented by flash memory and/or any other desired type of memory device. Access to the memory P115 and the memory P120 may be controlled by a memory controller. The example memory P115 may be used to, for example, store the example operation database 155.

The processor platform P100 includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

One or more input devices P135 may be connected to the interface circuit P130. The input device(s) P135 can be implemented by, for example, a keyboard, a mouse, a touch screen, a track-pad, a trackball, isopoint and/or a voice recognition system. One or more output devices P140 are also connected to the interface circuit 1020. The output devices P140 can be implemented, for example, by display devices (e.g., a liquid crystal display, a cathode ray tube display (CRT), a printer and/or speakers). The interface circuit P130 may, thus, include a graphics driver card. The input device(s) P135 and the output device(s) P140 may, additionally or alternatively, be used to provide information such as a list of identified execution paths and/or test results, and/or to receive selections of execution paths to be tested.

The interface circuit P130 may also includes a communication device such as a modem, transceiver or network interface card to facilitate exchange of data with external computers via a network.

In some examples, the processor platform P100 also includes one or more mass storage devices P145 to storing software and data. Examples of such mass storage devices P145 include a floppy disk drive, a hard disk drive, a solid-state hard disk drive, a CD drive, a DVD drive and/or any other solid-state, magnetic and/or optical storage device. The mass storage device P145 may implement the example operation database 155.

The coded instructions disclosed herein may be stored in the mass storage device P145, in the RAM P115, in the ROM P120, and/or on a removable storage medium such as a CD or a DVD.

From the foregoing, it will appreciate that the above disclosed methods, apparatus and articles of manufacture to test process control systems. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
identifying, using a processor, an execution path through a batch configuration of a first version of a process control system;
generating a test plan for the execution path, wherein generating the test plan includes augmenting the batch configuration with an operational command based on the identified execution path;
simulating the first version of the process control system and a second version of the process control system to execute the test plan; and
determining a difference between the first version of the process control system and the second version of the process control system by comparing a first result from the execution path of the test plan through the first version of the process control system and a second result from the execution path of the test plan through the second version of the process control system.

2. A method as defined in claim 1, further comprising:
identifying a second execution path through the batch configuration of the first version of the process control system;
presenting the execution path and the second execution path to a user; and
receiving an input selecting the execution path for testing.

3. A method as defined in claim 1, wherein identifying the execution path through the batch configuration of the first version of the process control system comprises:
identifying additional execution paths through the batch configuration of the first version of the process control system between an initial node and a corresponding termination node;
merging portions of execution paths that diverge and converge; and
creating a path description for each of the execution paths.

4. A method as defined in claim 1, wherein generating the test plan comprises:
identifying a sequence of interactions representing the execution path; and
inserting the operational command into the sequence to cause the first version of the process control system and the second version of the process control system to execute the test plan.

5. A method as defined in claim 1, further comprising comparing the first result to at least one of a third result of the test plan executed on a project design objective or a functional test objective.

6. A method as defined in claim 5, further comprising verifying execution of the batch configuration of the first version of the process control system based on the difference between the first version of the process control system and the second version of the process control system.

7. The method of claim 6, wherein verifying execution of the batch configuration of the first version of the process control system comprises verifying at least one of an execution time, a correction of an error, or a response to a user input by the first version of the process control system.

8. The method of claim 1, wherein the first result is representative of an expected result and the second result is representative of a result after a modification to the process control system.

9. An apparatus comprising:
a path discoverer to identify an execution path through a batch configuration of a first version of a process control system;
a test plan creator to generate a test plan for the execution path, wherein the test plan creator is to augment the batch configuration with an operational command based on the identified execution path; and
a test plan executor to simulate the first version of the process control system and a second version of the process control system to execute the test plan, and to determine a difference between the first version of the process control system and the second version of the process control system by comparing a first result from the execution path of the test plan through the first version of the process control system and a second result from the execution path of the test plan through the second version of the process control system.

10. An apparatus as defined in claim 9, wherein:
the path discoverer is to identify a second execution path through the batch configuration of the first version of the process control system; and
the test plan creator is to present the execution path and the second execution path to a user, and is to receive an input selecting the execution path for testing.

11. An apparatus as defined in claim 9, wherein the path discoverer is to:
identify additional execution paths through the batch configuration of the first version of the process control system between an initial node and a corresponding termination node;
merge portions of execution paths that diverge and converge; and
create a path description for each of the execution paths.

12. An apparatus as defined in claim 9, wherein the test plan creator is to:
identify a sequence of interactions representing the execution path; and
insert the operational command into the sequence to cause the test plan executor to simulate the first version of the process control system and the second version of the process control system to execute the test plan.

13. An apparatus as defined in claim 9, further comprising a comparer to compare the first result to at least one of a third result of the test plan executed on a project design objective or a functional test objective.

14. An apparatus as defined in claim 9, further comprising verifying execution of the batch configuration of the first version of the process control system based on the difference between the first version of the process control system and the second version of the process control system.

15. A machine readable storage device or storage disc having instructions stored thereon that, when executed, cause a processor to at least:
identify an execution path through a batch configuration of a first version of a process control system;
generate a test plan for the execution path, wherein the instructions are to cause the processor to augment the batch configuration with an operational command based on the identified execution path;
simulate the first version of the process control system and a second version of the process control system to execute the test plan; and
determine a difference between the first version of the process control system and the second version of the process control system by comparing a first result from the execution path of the test plan through the first version of the process control system and a second result from the execution path of the test plan through the second version of the process control system.

16. A machine readable storage device or storage disc as defined in claim 15, wherein the instructions, when executed, cause a processor to:
identify a second execution path through the batch configuration of the first version of the process control system;
present the execution path and the second execution path to a user; and
receive an input selecting the execution path for testing.

17. A machine readable storage device or storage disc as defined in claim 15, wherein the instructions, when executed, cause a processor to identify the execution path by at least:
identifying additional execution paths through the batch configuration of the first version of the process control system between an initial node and a corresponding termination node;
merging portions of execution paths that diverge and converge; and
creating a path description for each of the execution paths.

18. A machine readable storage device or storage disc as defined in claim 15, wherein the instructions, when executed, cause a processor to generate the test plan by at least:
identifying a sequence of interactions representing the execution path; and
inserting the operational command into the sequence to cause the first version of the process control system and the second version of the process control system to execute the test plan.

19. A machine readable storage device or storage disc as defined in claim 15, wherein the instructions, when executed, cause a processor to compare the first result to at least one of a third result of the test plan executed on a second process control system, a project design objective or a functional test objective.

20. A machine readable storage device or storage disc as defined in claim 15, wherein the instructions, when executed, cause a processor to verify execution of the first version of the process control system based on the difference between the first version of the process control system and the second version of the process control system.

* * * * *